Nov. 1, 1932.    J. C. DAMON    1,886,086
CONNECTER FOR CABLES
Original Filed Sept. 29, 1927
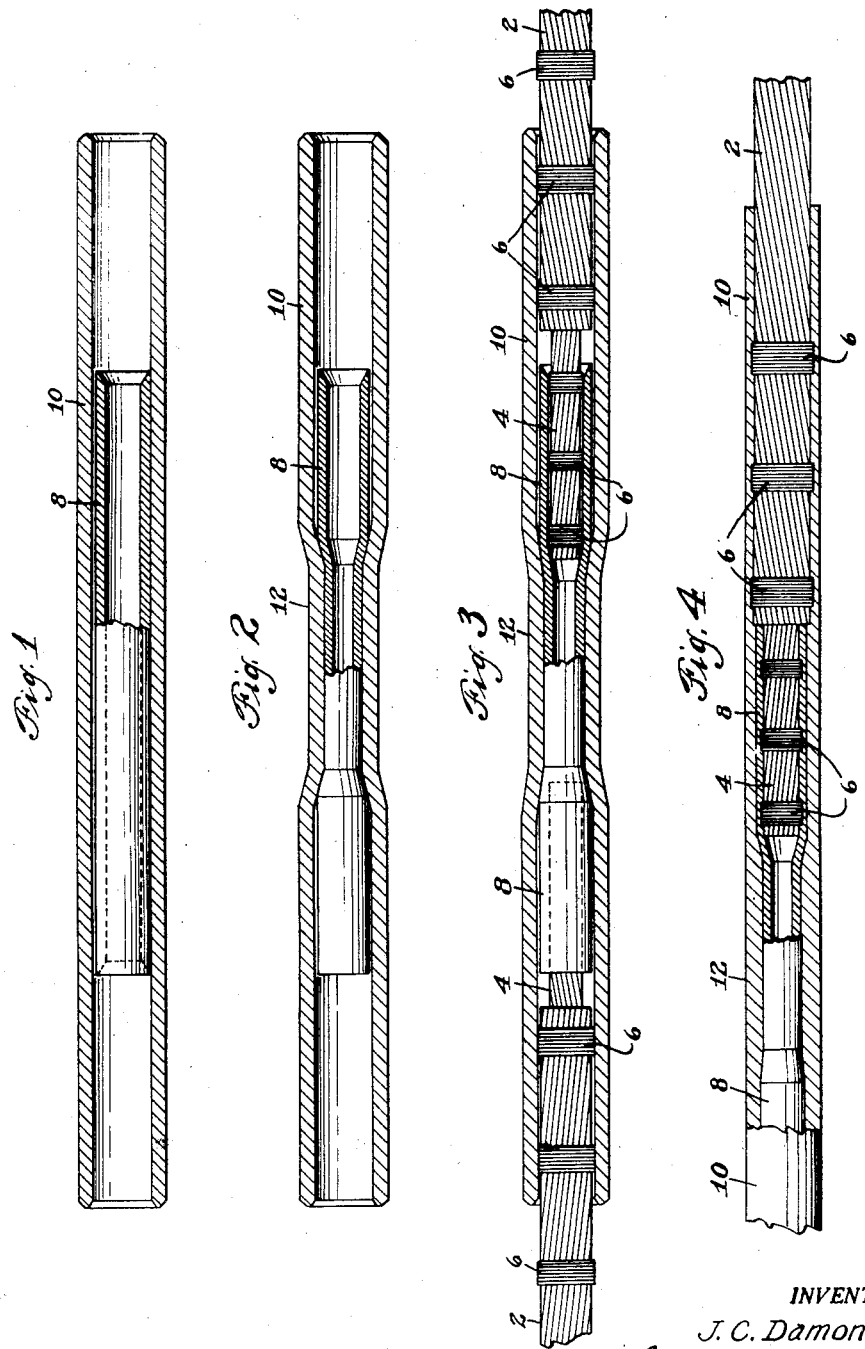
INVENTOR.
J. C. Damon
BY
ATTORNEYS.

Patented Nov. 1, 1932

1,886,086

UNITED STATES PATENT OFFICE

JOHN C. DAMON, OF CHESHIRE, CONNECTICUT, ASSIGNOR TO THE AMERICAN BRASS COMPANY, OF WATERBURY, CONNECTICUT, A CORPORATION OF CONNECTICUT

CONNECTER FOR CABLES

Original application filed September 29, 1927, Serial No. 222,731. Divided and this application filed September 8, 1928. Serial No. 304,827.

My invention relates to connecters for cables and other bodies, and has for its object to provide a novel and improved article of manufacture of this character. It further has for its object to provide a novel and improved connecter that is particularly adapted for use in connecting cables of relatively large diameter. Still another object of the invention is to provide a connecter of the character indicated which is of simple and cheap construction, and may be easily and quickly applied.

The several features of the invention, whereby the above mentioned and other objects may be attained, will be clearly understood from the following description and accompanying drawing, in which:

Fig. 1 is a longitudinal sectional view of blanks shown assembled from which my improved connecter may be formed;

Fig. 2 is a similar view after the blanks have been operated upon preparatory to the application thereof to the bodies to be connected;

Fig. 3 is a similar view but showing the ends of two stranded cables inserted in the ends of the connecter; and Fig. 4 is a similar view showing the completed joint formed in accordance with my improved method.

My improved connecter may be and preferably is formed in accordance with the method described and claimed in my pending application Serial No. 222,731, filed September 29, 1927, of which the present application is a division.

The connecter is particularly adapted for use in connecting the ends of two cables 2 that are made up of a plurality of layers of strands, or a cable having a central core on which the strands are laid. In either case the outer layer or layers of strands are preferably cut off a distance from the end of each cable so as to provide a reduced end portion or core 4. This reduced end portion or core 4 and the adjacent portion of the body of the cable is served with wire 6 at a plurality of points spaced apart.

The connecter is formed from two casings or tubes 8 and 10, arranged one within the other, with the ends of the inner tube 8 spaced a distance from the ends of the outer tube. The outer diameter of the inner tube may be slightly less than the inner diameter of the outer tube; the inner diameter of the inner tube may be slightly greater than said reduced end portion 4 of the cable; and the inner diameter of the outer tube may be slightly greater than the diameter of the body of the cable, so as to permit these parts to be easily assembled. After the tubes are assembled they are reduced in diameter for a distance intermediate their ends, as indicated at 12, Fig. 2. This may be done by swaging, rolling or any other convenient process.

The ends of the cables are then inserted in the ends of the tube until they abut the ends of said reduced portion 12 of the inner tube. When thus assembled the ends of the inner tube are spaced a distance from the shoulders formed by the junctions of the reduced portions and the bodies of the cables, and the ends of the outer tube extend a distance over the ends of said bodies.

With the connecter thus applied to the ends of the cable, it is subjected to a drawing or similar mechanical action applied to the surface of the outer tube in a direction toward opposite ends thereof from its reduced intermediate portion. In thus drawing the connecter over the cables, any suitable means may be employed such as the apparatus illustrated and described in the patent to A. J. Auspitzer, No. 1,599,356, dated September 7, 1926.

Such drawing action results in intimate interengagement of the materials of the inner tube and the reduced end portions of the cables, the outer tube and the bodies of the cables, and the inner and outer tubes.

The serving of wire about the strands of the cable not only holds the strands firmly together but also the grip provided by their use with relation to the connecter is improved. The spaces between the ends of the inner tube and the ends of the bodies of the cables allow for the lengthening of the inner tube during the drawing operation.

It will be apparent that my improved article is particularly advantageous in connecting cables of so many layers of strands that all the strands can not be securely gripped from the outside without injury to some of them, and also cables having a central core.

In making an installation with my improved connecter there is a distinct time saving. Also, with my improved connecter, less material is required and hence less working of material, and the completed article is a better commercial product than those heretofore employed.

Preferably the ends of the connecter tubes are chamfered off, the end of the outer tube on both the inner and outer sides, and the ends of the inner tube on the inside. This chamfering of the ends of the tubes prevents the gradient of stiffness from falling off too abruptly at the ends of the tubes and reduces the tendency of the completed joint to fail at said ends. It also prevents the ends of the connecter tubes from cutting into the cables so as to weaken the cables at these points.

As will be evident to those skilled in the art, my invention permits various modifications without departing from the spirit thereof or the scope of the appended claims.

What I claim is:

1. An article of manufacture of the class described comprising two cables arranged in alinement with their ends spaced apart and reduced in diameter, a connecter tube surrounding said reduced ends, a second connecter tube surrounding said first mentioned tube and extending a distance over the bodies of the cables, the inner tube being reduced in diameter between said spaced ends of the cables and the materials of said inner tube and said reduced ends of the cables, the materials of said outer tube and the bodies of the cables, and the materials of the two tubes throughout the length of the inner tube being in intimate interengagement.

2. An article of manufacture of the class described comprising two cables arranged in alinement with their ends spaced apart and reduced in diameter, a plurality of spaced servings of wire about the cable ends, a connecter tube surrounding said reduced ends, a second connecter tube surrounding said first mentioned tube and extending a distance over the bodies of the cables, the inner tube being reduced in diameter between said spaced ends of the cables and the materials of said inner tube and said reduced ends of the cables, the materials of said outer tube and the bodies of the cables, and the materials of the two tubes throughout the length of the inner tube being in intimate inter-engagement.

In testimony whereof, I have signed my name to this specification this 28th day of August, 1928.

JOHN C. DAMON.